United States Patent
Minyard et al.

(10) Patent No.: US 10,919,632 B2
(45) Date of Patent: Feb. 16, 2021

(54) SYSTEMS AND METHODS FOR POSITIONING A SECTION DIVIDER ASSEMBLY WITHIN A VEHICLE

(71) Applicant: THE BOEING COMPANY, Chicago, IL (US)

(72) Inventors: Derek A. Minyard, Seattle, WA (US); Brent Clarence Walton, Renton, WA (US); Christopher L. Schwitters, Everett, WA (US); David J. Barene, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 487 days.

(21) Appl. No.: 15/730,200

(22) Filed: Oct. 11, 2017

(65) Prior Publication Data

US 2019/0106213 A1    Apr. 11, 2019

(51) Int. Cl.
*B64D 11/00* (2006.01)
(52) U.S. Cl.
CPC ................. *B64D 11/0023* (2013.01)
(58) Field of Classification Search
CPC ... B64D 11/0023; B64D 11/003; B64D 11/10; B64D 2011/0046; B61D 17/048; B64C 1/10
See application file for complete search history.

(56) References Cited

U.S. PATENT DOCUMENTS

| | | | |
|---|---|---|---|
| 2,294,295 A | 8/1942 | Hankins | |
| 2,605,064 A | 7/1952 | Davis | |
| 2,658,759 A | 11/1953 | Flory | |
| 2,710,731 A | 6/1955 | Bright | |
| 4,088,322 A | 5/1978 | Nikoden | |
| 4,102,381 A | 7/1978 | Bratschi | |
| 5,165,626 A * | 11/1992 | Ringger | B64D 11/0023 16/282 |
| 6,189,831 B1 | 2/2001 | Asai | |
| 6,523,779 B1 | 2/2003 | Michel | |
| 8,262,022 B2 | 9/2012 | Young | |
| 8,556,212 B2 * | 10/2013 | Breuer | B64D 11/00 104/89 |
| 8,684,308 B2 | 4/2014 | Warner | |
| 9,108,734 B2 * | 8/2015 | Chandler | B64D 11/0023 |

(Continued)

FOREIGN PATENT DOCUMENTS

| | | |
|---|---|---|
| AU | 523380 | 8/1982 |
| EP | 1619120 | 1/2006 |
| WO | WO 2013/142660 | 9/2013 |

*Primary Examiner* — Medhat Badawi
*Assistant Examiner* — Vicente Rodriguez
(74) *Attorney, Agent, or Firm* — The Small Patent Law Group LLC; Joseph M. Butscher

(57) ABSTRACT

A section divider assembly is configured to be positioned above one or more seats and indicate a boundary of a section onboard a cabin of a vehicle. The section divider assembly includes an attachment header, and a barrier extending downwardly from the attachment header. A first coupler is secured to the attachment header. The first coupler is configured to be removably secured to a first fitting secured to a strongback of a stowage bin assembly within the cabin. A second coupler is secured to the attachment header and spaced apart from the first coupler. The second coupler is configured to be removably secured to a second fitting secured to a fixed rail within the cabin.

26 Claims, 13 Drawing Sheets

(56) References Cited

U.S. PATENT DOCUMENTS

| | | | |
|---|---|---|---|
| 9,139,301 B2 * | 9/2015 | Slyter | B64D 11/0023 |
| 9,499,271 B2 | 11/2016 | Walton | |
| 2006/0032155 A1 * | 2/2006 | Thomassin | B64D 11/0023 |
| | | | 52/36.2 |
| 2007/0018044 A1 | 1/2007 | Bock | |
| 2009/0321574 A1 * | 12/2009 | Erickson | E05C 1/02 |
| | | | 244/131 |
| 2012/0112505 A1 * | 5/2012 | Breuer | B64D 11/0023 |
| | | | 297/217.1 |
| 2018/0348124 A1 * | 12/2018 | Gobel | G01N 21/3581 |

* cited by examiner

SYSTEMS AND METHODS FOR POSITIONING A SECTION DIVIDER ASSEMBLY WITHIN A VEHICLE

FIELD OF EMBODIMENTS OF THE DISCLOSURE

Embodiments of the present disclosure generally relate to systems and methods for positioning a section divider assembly within a vehicle, such as a commercial aircraft.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle and curtain assemblies above and behind seat backs on either side of the aisle. A curtain movably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

Known class or section dividers include a movable curtain positioned within an aisle and lateral curtains extending from the aisle to outboard interior walls within a cabin. Such class dividers provide a stark closed appearance. The closed curtains of the class divider tend to compartmentalize an interior cabin.

Additionally, the class dividers are typically fixed with respect to a location within the interior cabin. In order to reposition the class dividers, portions of stowage bins and passenger service units are typically removed to expose fasteners. Aircraft technicians, such as mechanics, then remove the fasteners and mounting structures and secure the assemblies at another position. As can be appreciated, the process of repositioning class dividers is time and labor intensive.

However, between or even during flights, aircraft staff may opt to reconfigure the sections onboard an aircraft. For example, between flights, aircraft crew may opt to expand one section onboard a subsequent flight, depending on the number of type of passenger seats for the subsequent flight.

SUMMARY OF THE DISCLOSURE

A need exists for a class divider that may be quickly and efficiently repositioned within an interior cabin of an aircraft. Further, a need exists for a class divider that may be quickly and easily moved by flight attendants between flights of an aircraft.

With those needs in mind, certain embodiments of the present disclosure provide a section divider assembly that is configured to be positioned above one or more seats and indicate a boundary of a section onboard a cabin of a vehicle. The section divider assembly includes an attachment header, and a barrier extending downwardly from the attachment header. A first coupler is secured to the attachment header. The first coupler is configured to be removably secured to a first fitting secured to a strongback of a stowage bin assembly within the cabin. A second coupler is secured to the attachment header and spaced apart from the first coupler. The second coupler is configured to be removably secured to a second fitting secured to a fixed rail within the cabin.

The first coupler may be an inboard coupling. The first fitting may be an inboard fitting. The second coupler may be an outboard coupling. The second fitting may be an outboard fitting secured to the fixed rail. In at least one embodiment, the first fitting and the second fitting are hidden from view when the section divider assembly is disconnected therefrom.

In at least one embodiment, the first fitting includes a base defining an internal chamber. The internal chamber includes opposed clamp pockets and opposed lever pockets. A latch opening is defined at a front of the base. The latch opening is configured to receive a latch of the first coupler. Opposed clamps are retained with the opposed clamp pockets. The opposed clamps securely engage a portion of the first coupler. Opposed levers are retained with the opposed lever pockets. The lever pockets are operably connected to the opposed clamps to selectively move the opposed clamps in relation to the latch. The opposed levers are configured to be squeezed towards one another to release the opposed clamps from the latch of the first coupler. A cantilevered beam may be configured to cantilever the first fitting in relation to the strongback to allow the section divider assembly to be positioned between stowage bin assemblies.

In at least one embodiment, the first coupler includes a latch that is configured to be urged into and removably secured to the first fitting.

In at least one embodiment, the second fitting includes an adapter that secures to the fixed rail, and a covering panel connected to the adapter. The covering panel includes a passage formed therethrough. A connection pocket connects to the passage and is defined between the adapter and the covering panel. A portion of the second coupler is configured to be urged into the passage and latch onto the second fitting within the connection pocket.

In at least one embodiment, the second coupler includes a resilient connecting tab that is configured to removably secure to the second fitting.

The first coupler may be configured to be latched to the first fitting. The second coupler may be configured to be upwardly pivoted about a connection between the first coupler and the first fitting into a secure connection with the second fitting.

In at least one embodiment, the first fitting is positioned between the strongback and a pivot bin when the pivot bin is closed. The second fitting is secured underneath the fixed rail.

The first coupler may be configured to suspend the section divider assembly from the first fitting when the second coupler is disconnected from the second fitting. In at least one embodiment, the first fitting includes one or more stops proximate to a latch opening. The stop(s) are configured to halt retreating motion of the first coupler in relation to the first fitting.

Certain embodiments of the present disclosure provide a section divider positioning system within a cabin of a vehicle. The section divider positioning system includes a stowage bin assembly within the cabin. The stowage bin assembly includes a fixed strongback and a pivot bin connected to the strongback. The pivot bin is configured to move between open and closed positions in relation to the strongback. A first fitting is secured to the strongback. A fixed rail extends over a length of at least a portion of the cabin. The fixed rail is spaced apart from the strongback. A second fitting is secured to the fixed rail. A section divider assembly is configured to be positioned above one or more seats and indicate a boundary of a section onboard the cabin. The section divider assembly includes an attachment header, and a barrier extending downwardly from the attachment header. A first coupler is secured to the attachment header. The first coupler is configured to be removably secured to the first fitting secured to the strongback. A second coupler is secured to the attachment header and spaced apart from the first coupler. The second coupler is configured to be removably secured to the second fitting secured to the fixed rail.

Certain embodiments of the present disclosure provide a section divider positioning method within a cabin of a vehicle. The section divider positioning method includes securing a first fitting to a strongback of a stowage bin assembly within the cabin, securing a second fitting to a fixed rail that extends over a length of at least a portion of the cabin (wherein the fixed rail is spaced apart from the strongback), and removably positioning a section divider assembly above one or more seats within the cabin to indicate a boundary of a section onboard the cabin. The removably positioning includes removably securing a first coupler of the section divider assembly to the first fitting, and removably securing a second coupler of the section divider assembly to the second fitting.

DETAILED DESCRIPTION OF THE DISCLOSURE

Figure 1:
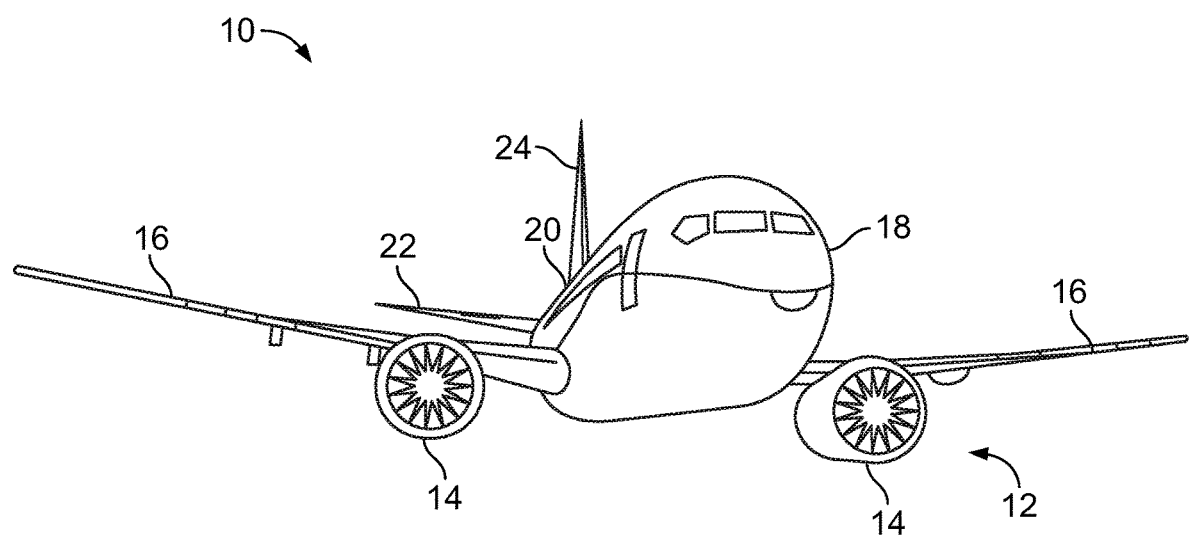
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a section divider assembly that may be quickly and easily positioned and repositioned within a vehicle, such as an aircraft. The section divider assembly that may be quickly and easily moved within an internal cabin of a vehicle. The section divider assembly may be quickly and easily moved among multiple pre-set locations. As such, a service crew of the vehicle (such as flight attendants) may move the section divider assembly relative to rows within the internal cabin depending on service needs for various routes of the vehicle.

The section divider assembly is configured to indicate a boundary of a section onboard a cabin of a vehicle, and may be selectively moved to selectively vary the boundary of the section.

The section divider assembly includes at least one coupler that is configured to removably secure (that is, without the use of separate and distinct fasteners such as screws or bolts that fix the coupler(s) to a structure) to a fitting that is secured to a portion of a stowage bin assembly. For example, the section divider assembly may include an inboard coupler that is configured to removably secure to an inboard fitting that is secured to a strongback of a stowage bin assembly. An outboard fitting may be mounted to a fixed structure within a cabin, such as a ventilation (for example, air conditioning) rail. Accordingly, the section divider assembly may include an outboard coupler that removably secured to the outboard fitting.

The section divider assembly is configured to be quickly and easily connected and disconnected from the fitting(s) within the cabin, such as without the use of tools. The fittings within the cabin may be shrouded, hidden, or otherwise discrete, and thereby not affect (or minimally affect) the interior aesthetics of the cabin.

Embodiments of the present disclosure provide section divider assembly that allow service providers (for example, airlines) with flexible classes to relocate the section divider assemblies based on the particular number of class seats sold for any particular flight.

In at least one embodiment, the section divider assembly includes a hand actuated latch mechanism that is configured to removably secure to structural adapters within a cabin, thereby allowing incremental positioning along the length of the cabin to align with seat arrangement. The section divider assembly and/or the fitting may also include false latching indication as well as safety features that prevent or otherwise reduce inadvertent tampering and/or disengagement of the section divider assembly.

Certain embodiments of the present disclosure provide systems and methods for selectively attaching an over-seat section divider assembly to an interior of a vehicle. The section divider assembly is configured to attach to two locally-reinforced locations situated laterally relative to each other. The attach points may be located outboard and/or below the stowage bin assemblies.

Embodiments of the present disclosure provide section divider assemblies, systems, and methods that allow for quick and easy reconfiguration of class areas on a vehicle. Further, the section divider assemblies, systems, and methods provide structurally robust attachments, lightweight, low cost designs, aesthetically pleasing solutions (for example, attachment fittings may be hidden behind decorative panels), tamper resistant design (for example, attachment/detachment may require specific hand manipulation), tamper evident design (for example, section divider assembly may appear to hand down if not connected properly), and failsafe design (for example, if the section divider assembly is not properly connected, it will not fall or drop).

FIG. 1 illustrates a perspective front view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class/section divider assemblies, as described herein.

Alternatively, instead of an aircraft, embodiments of the present disclosure may be used with various other vehicles, such as automobiles, buses, locomotives and train cars, seacraft, spacecraft, and the like.

Figure 2A:
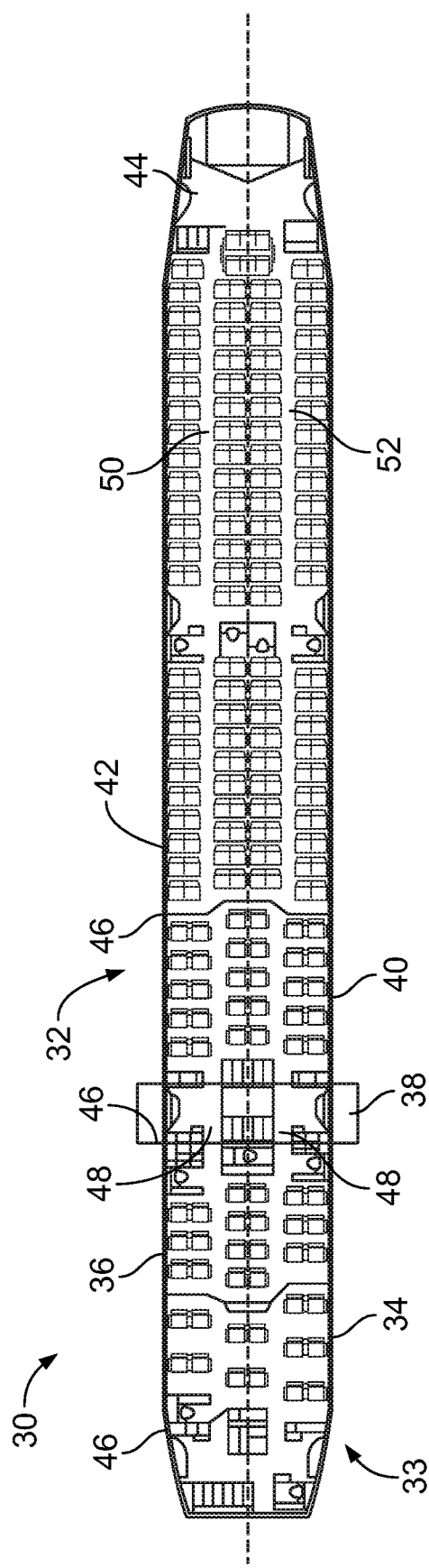
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft 10, shown in FIG. 1. For example, one or more fuselage walls may define the internal cabin 30. The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class/section divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
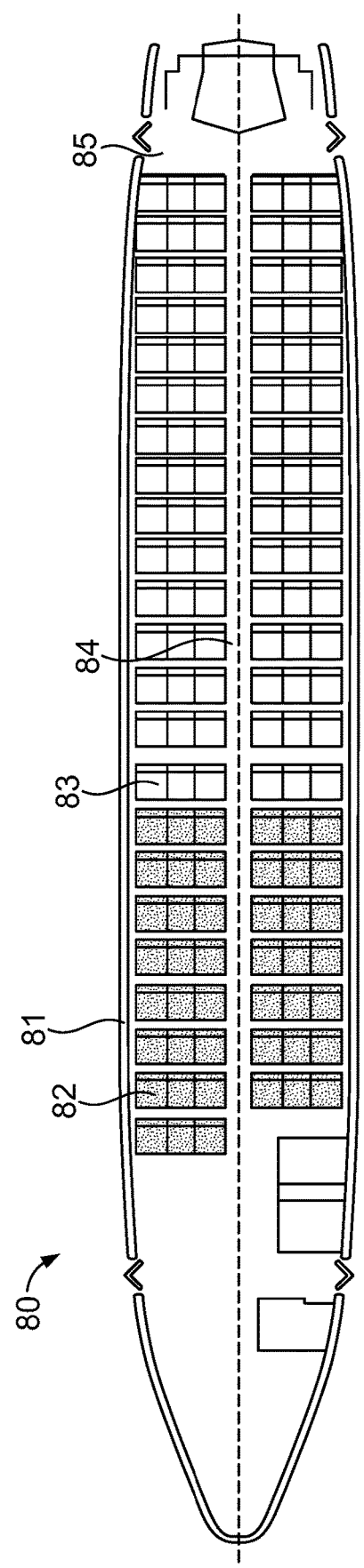
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft 10, shown in FIG. 1. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
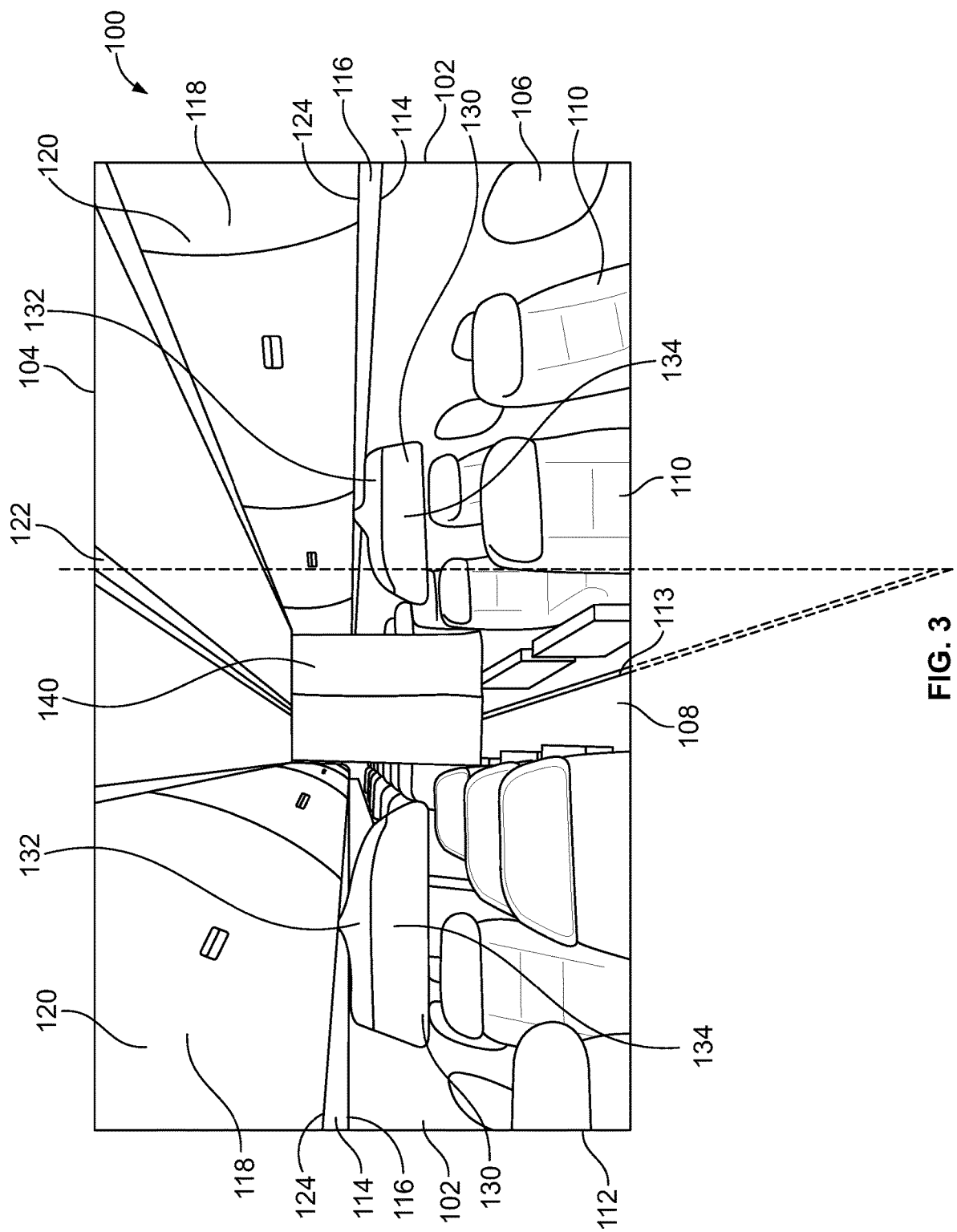
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bins 118 are secured to the ceiling 104 and/or the outboard wall 102 above and inboard from the PSU 114 on either side of the aisle. The overhead stowage bins 118 extend between the front and rear end of the internal cabin 100. Each overhead stowage bin 118 may include a pivot bin or bucket 120 pivotally secured to a strongback (hidden from view in FIG. 3). The overhead stowage bins 118 may be positioned above and inboard from lower surfaces of the PSUs 114. The overhead stowage bins 118 are configured to be pivoted open in order to accept passenger carry-on luggage, for example.

As used herein, the term "outboard" means a position that is further away from a central longitudinal plane 122 (may also be referred to as buttock line zero) of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin 118.

As shown, a gap 124 extends along a length of the internal cabin 100 between the PSU 114 and the stowage bins 118 on each side of the aisle 113. The gap 124 allows the buckets 120 of the stowage bins 118 to be pivoted between open and closed positions.

A section divider assembly 130 may be positioned within the internal cabin 100 to define different sections therein. For example, the section divider assembly 130 may be positioned over one or more seats 110 within a row 112. Each section divider assembly 130 may include an attachment header 132 that securely connects to a downwardly-extending barrier 134. The attachment header 132 may be formed of metal, plastic, or the like. The barrier 134 may be formed of metal, composites, plastic, or the like. For example, the barrier 134 may be formed of a transparent, or semitransparent material. In at least one embodiment, the barrier 134 may be formed of lexan, plexiglass, or the like. Optionally, the barrier may be at least partially formed of a lightweight opaque material, such as fabric, mesh, and/or the like.

Each attachment header 132 securely connects to an inboard fitting (hidden from view), such as mounted or otherwise secured to a strongback of a stowage bin 118, and an outboard fitting (hidden from view), such as a rail that supports ventilation ducts, air conditioning units, and/or the like. Each attachment header 132 may be securely connected to overhead positions at two points, such as at the inboard fitting and the outboard fitting.

As shown, the internal cabin 100 may also include a movable curtain 140 extending downwardly from the ceiling 104 within the aisle 113. Alternatively, the internal cabin 100 may not include the curtain 140.

Figure 4:
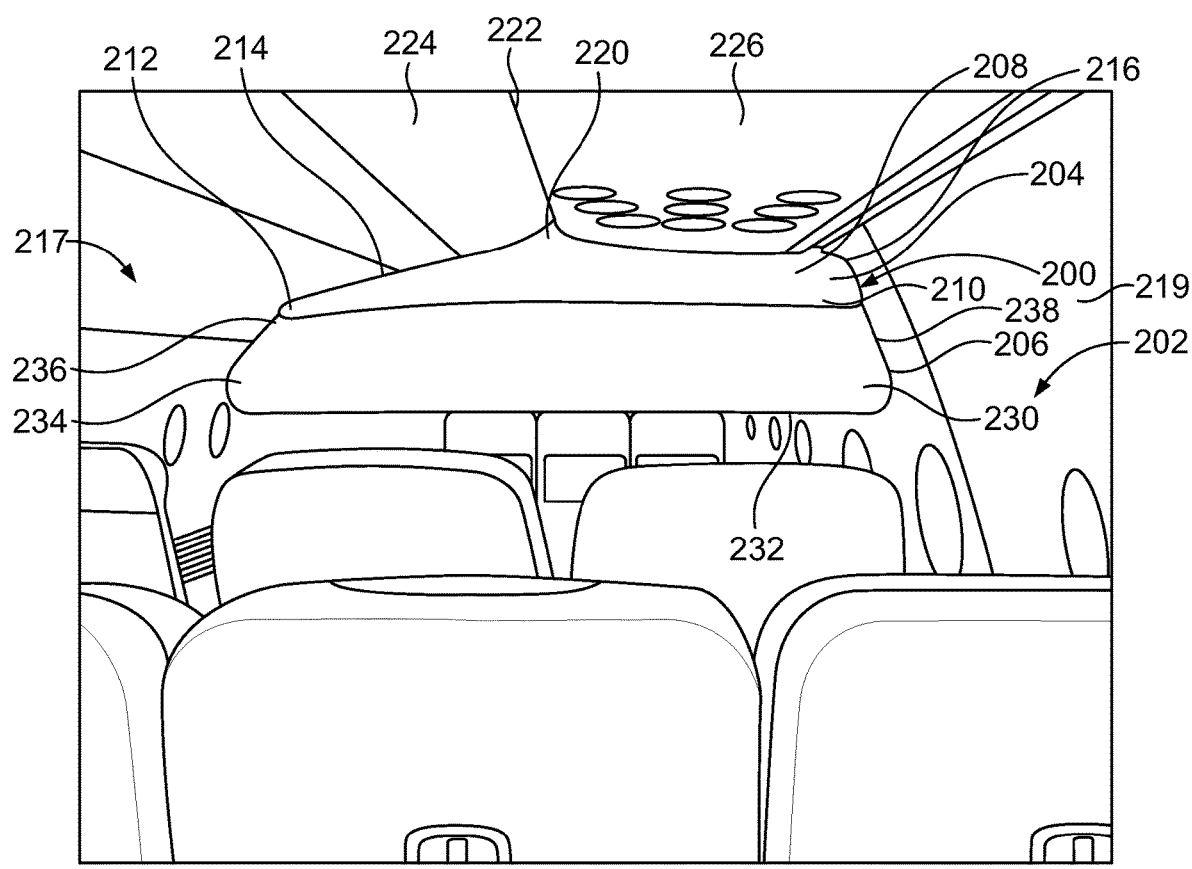
FIG. 4 illustrates a rear view of a section divider assembly within an internal cabin, according to an embodiment of the present disclosure.

FIG. 4 illustrates a rear view of a section divider assembly 200 within an internal cabin 202, according to an embodiment of the present disclosure. The section divider assembly 200 is an example of the section divider assembly 130 shown and described with respect to FIG. 3. While the rear portion of the section divider assembly 200 is shown, a front portion of the section divider assembly mirrors the rear portion. The section divider assembly 200 includes a header 204 that securely retains a barrier 206 extending downwardly from the header 204.

The header 204 may include a panel 208 (such as a single panel, or aligned panels that define an internal chamber therebetween) that may have a bottom edge 210 connected to an inboard tip 212, which connects to an upper edge 214, which, in turn, connects to an outboard end 216. The curvature of the outboard end 216 may conform to a curvature of the outboard wall 219. The outboard end 216 may, or may not, abut into the outboard wall 219. The bottom edge 210 may have straight and curved portions. For example, a portion of the bottom edge 210 may have a slight curvature. The inboard tip 212 may include a semi-circular curvature that connects to the upper edge 214. As shown, the height of the header 204 proximate to an aisle 217 may be shorter than a height of the header 204 proximate to the outboard wall 219. The upper edge 214 may include an intermediate peak 220 that extends into a gap 222 between a stowage bin 224 and a PSU 226. The intermediate peak 220 may include or connect to an inboard coupler that removably secures to an inboard fitting secured to a strongback of a stowage bin. Additionally, the section divider assembly 200 may include an outboard coupler that may be secured to the upper edge 214 and/or the outboard end 216. The outboard coupler is configured to connect to an outboard fitting that secures to an outboard rail (hidden from view), such as a HVAC rail that is configured to support one or more heating, ventilation, and/or air conditioning components, such as ventilation ducts, air conditioning units, heating units, and/or the like.

The header 204 is shown having arcuate surfaces and shapes. Alternatively, the header 204 may include various other shapes and sizes than shown. For example, the header 204 may be a linear, rectangular beam.

The barrier 206 may include a panel 230 (such as a single panel, or aligned panels that define an internal chamber therebetween) that may include a straight bottom edge 232 that connects to an inboard end 234 that inwardly curves (that is, inwardly curves away from the aisle 217) and connects to an upper edge 236 that is retained by the header 204. For example, the header 204 may include a slot that receives and retains the upper edge 236. Fasteners, adhesives, and the like may be used to secure the barrier 206 to the header 204. The upper edge 236 connects to an outboard end 238, which may be proximate to the outboard wall 219. The curvature of the outboard end 238 may conform to a curvature of the outboard wall 219. The outboard end 238 may, or may not, abut into the outboard wall 219.

The section divider assembly 200 may have various other shapes and sizes than shown. For example, the barrier 206 may be shaped as a rectangle. Further, the section divider assembly 200 may be longer or more compact than shown.

The inboard tip 212 and upper edge 214 of the header 204 may downwardly recede away from the stowage bin 224. The upper edge 214 may be downwardly angled to accommodate pivotal movement of a bucket of the stowage bin 224. All portions of the header 204 (and the barrier 206) may be outside a range of motion of moving portions of the stowage bin, so as not to interfere with movement of the stowage bin between open and closed positions. For example, as the bucket is downwardly pivoted into an open position, the upper edge 214 and the inboard tip 212 are sized and shaped so as not to interfere with movement of the bucket. In this manner, the upper edge 214 and the inboard tip 212 may be positioned below a lower limit of a range of motion of the bucket of the stowage bin 224.

Figure 5:
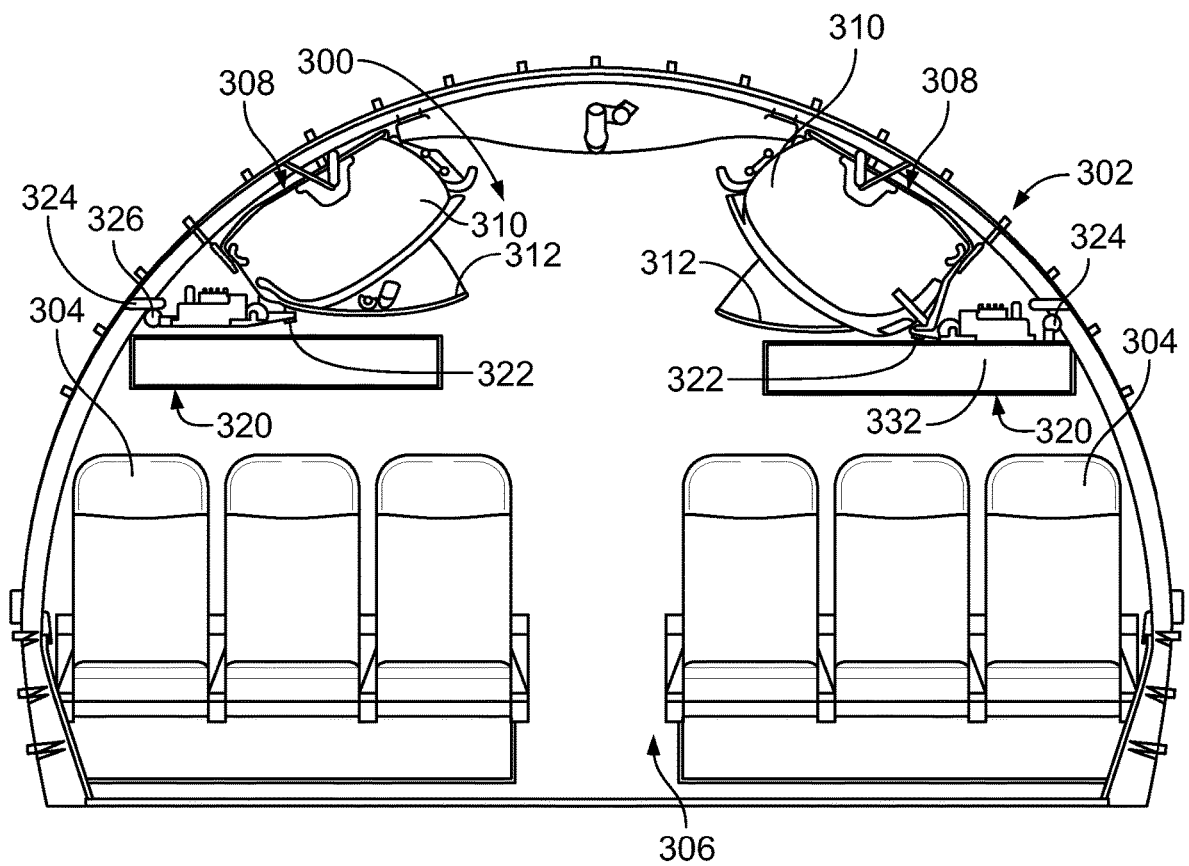
FIG. 5 illustrates an internal view of a cabin of a vehicle, according to an embodiment of the present disclosure.

FIG. 5 illustrates an internal view of a cabin 300 of a vehicle 302 (such as the aircraft 10, shown in FIG. 1), according to an embodiment of the present disclosure. The internal cabin 300 includes rows of seats 304 separated by an aisle 306. The internal cabin 300 may include more or less seats 304 in each row than shown. Further, the internal cabin 300 may include more aisles 306 than one.

Stowage bin assemblies 308 are positioned above the seats 304. Each stowage bin assembly 308 includes a strongback 310 fixed within the cabin 300 (such as securely mounted to internal portions of the fuselage, a ceiling, internal wall, and/or the like), and a pivot bin or bucket 312 that is configured to pivot between open and closed positions with respect to the strongback 310.

A section divider assembly 320 may be removably secured above the seats 304. The section divider assembly 320 is an example of the section divider assemblies 130 (shown in FIG. 3) and 200 (shown in FIG. 4). The section divider assembly 320 includes a first coupler, such as inboard coupler, (not shown in FIG. 5) that is configured to removably secure to a first fitting, such as an inboard fitting 322, that is secured to the strongback 310. Optionally, the first fitting may be an outboard fitting, such as if the strongback 310 is over a middle section of seats. The section divider assembly 320 also includes a second coupler, such as an outboard coupler, (not shown in FIG. 5) that is configured to removably secured to a second fitting, such as an outboard fitting 324, that is secured to an fixed rail, such as an outboard rail 326 (such as a ventilation rail that longitudinally extends through at least a portion of the cabin 300). Optionally, the second fitting may be an inboard fitting, such as if the strongback 310 is over a middle section of seats and inboard from the fixed rail.

Figure 6:
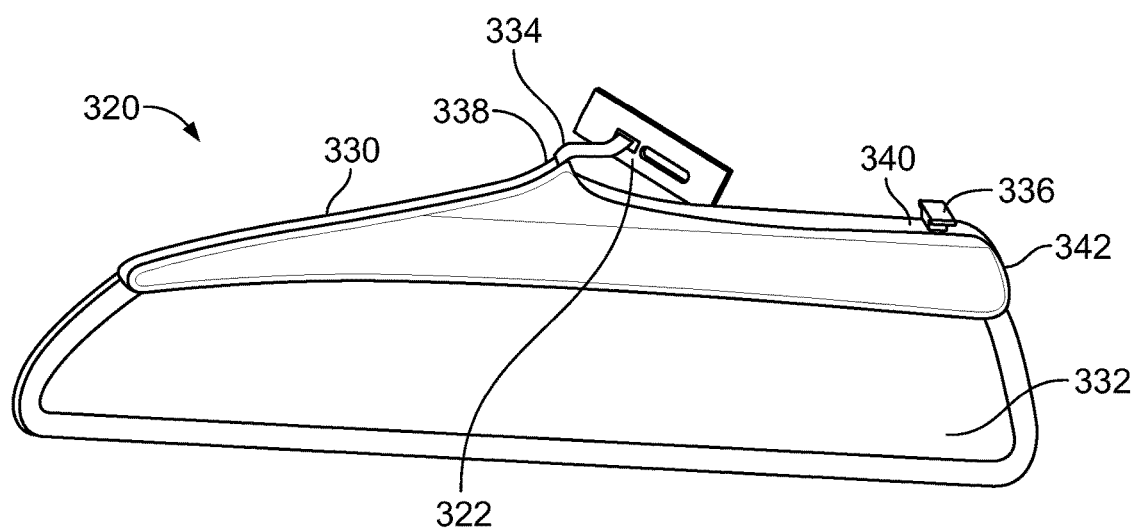
FIG. 6 illustrates a front view of a section divider assembly, according to an embodiment of the present disclosure.

FIG. 6 illustrates a front view of the section divider assembly 320, according to an embodiment of the present disclosure. The section divider assembly 320 includes an attachment header 330 and a barrier 332, such as described above. The section divider 320 also includes a first coupler, such as inboard coupler 334, spaced apart from a second coupler, such as an outboard coupler 336.

The inboard coupler 334 may be secured to an intermediate peak 338 of the header 330. The inboard coupler 334 is configured to removably secure to the inboard fitting 322 that secures to the strongback 310 of the stowage bin assembly 308 (shown in FIG. 5). The outboard coupler 336 may be secured to an upper edge 340 and/or an outboard end 342 of the header 330. The outboard coupler 336 is configured to connect to an outboard fitting (not shown in FIG. 6) that is secured to the outboard rail 326, such as a HVAC rail that is configured to support one or more heating, ventilation, and/or air conditioning components, such as ventilation ducts, air conditioning units, heating units, and/or the like.

Figure 7:
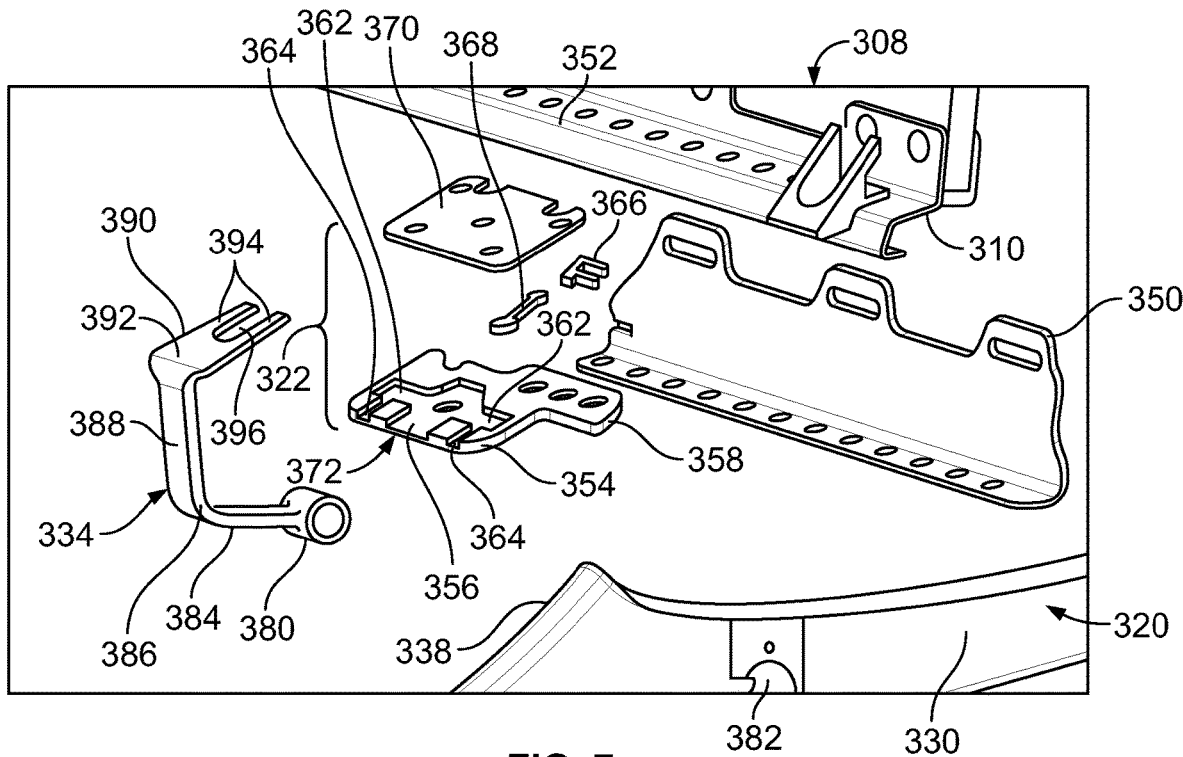
FIG. 7 illustrates a perspective top exploded view of an inboard fitting that secures to a strongback and an inboard coupler that secures to a header of a section divider assembly, according to an embodiment of the present disclosure.

FIG. 7 illustrates a perspective top exploded view of the inboard fitting 322 that secures to the strongback 310 and the inboard coupler 334 that secures to the header 330 of the section divider assembly 320, according to an embodiment of the present disclosure. The inboard fitting 322 secures underneath the strongback 310, such as through a bracket 350 that secures to a rail 352 or other lower structure of the strongback 310, such as through fasteners, adhesives, and/or the like. The inboard coupler 334 is configured to secure to the header 330, such as proximate to the intermediate peak 338.

The inboard fitting 322 includes a base 354 defining an internal chamber 356, and a cantilever beam 358. The cantilevered beam 358 is configured to secure to the bracket 350 so that the inboard fitting 322 may be cantilevered in relation to the strongback 310, in order to allow the section divider assembly 320 to be positioned between stowage bin assemblies 308. Optionally, the inboard fitting 322 may not include the cantilevered beam 358, and the base 354 may directly couple to the bracket 350 and/or the rail 352, such as through fasteners, adhesives, and/or the like.

The internal chamber 356 formed in the base 354 includes opposed clamp pockets 362 and opposed lever pockets 364. The clamp pockets 362 are configured to retain opposed clamps 366, while the opposed lever pockets 364 are configured to retain opposed levers 368. For the sake of clarity, only one clamp 366 and one lever 368 are shown in FIG. 7.

The inboard fitting 322 also includes a cover 370 that secured over the base 354. The cover 370 ensures that the clamps 366 and levers 368 remain within the internal chamber 356. A latch opening 372 is defined at a front of the inboard fitting 322 between the base 354 and the cover 370. Optionally, instead of the base 354 securing the strongback 308, the cover 370 may secure to the strongback 308. In at least one embodiment, both the cover 370 and the base 354 secure to portions of the strongback 308. In at least one other embodiment, the inboard fitting 322 may be integrally formed with a portion of the strongback 308.

The inboard coupler 334 includes a stud 380 (such as a cylindrical protuberance) that fits within an secures to a reciprocal opening 382 formed in the header 330. The stud 380 connects to an inward extension beam 384 that extends inboard. The inward extension beam 384, in turn, connects to an arcuate bend 386 that connects to an upward extension beam 388. A latch 390 cants towards an outboard direction from the upward extension beam 388. The latch 390 includes a main body 392 and two latching prongs 394 separated by a gap 396. Optionally, instead of a separate and distinct component that secures to the header 330, the inboard coupler 334 may be integrally formed with the header 330.

In operation, the latch 390 is inserted into the latch opening 372 and is retained by the opposed clamps 366 to secure the inboard coupler 334 to the inboard fitting 322. In order to remove the inboard coupler 334 from the inboard fitting 322, an individual squeezes the opposed levers 368 together, which engage the clamps 366 to disengage from the latch 390, at which point the latch 390 may be removed from the inboard fitting 322.

Figure 8:
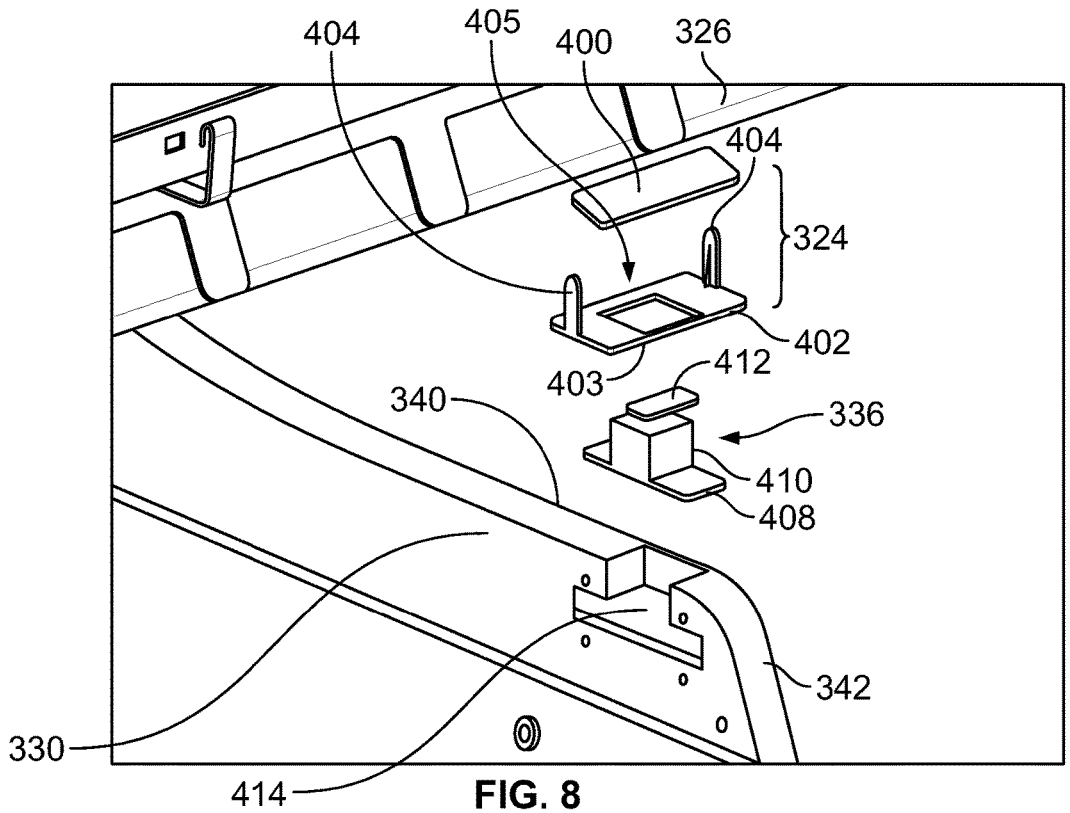
FIG. 8 illustrates a perspective top exploded view of an outboard fitting that secures to an outboard rail and an outboard coupler that secures to a header of a section divider assembly, according to an embodiment of the present disclosure.

FIG. 8 illustrates a perspective top exploded view of the outboard fitting 324 that secures to the outboard rail 326 and the outboard coupler 336 that secures to the header 330 of the section divider assembly 320, according to an embodiment of the present disclosure. The outboard fitting 324 may include an adapter 400 that secures to the outboard rail 326, such as through one or more fasteners, adhesives, and/or the like. A covering panel 402 secures to the adapter 400, such as through fasteners, adhesives, and/or the like. In at least one embodiment, the adapter 400 and the covering panel 402 may be integrally formed as a single piece.

The covering panel 402 includes a passage 403 formed therethrough. Lateral offset beams 404 extend upwardly from either side of the covering panel 402 and are secure to the adapter 400, to offset the covering panel 402 from the adapter 400 and form a connection pocket 405 therebetween.

The outboard coupler 336 includes a flat base 408, a main block 410 extending upwardly from the base 410, and a resilient connecting tab 412 over the base main block 410. The base 408 and the block 410 are configured to be received and retained within a reciprocal recess 414 formed in the header 330 proximate to the outboard end 342. The outboard coupler 336 may secure to the header 330 through fasteners, adhesives, and/or the like. Optionally, the outboard coupler 336 may be integrally formed with the header 330 proximate to the outboard end 342.

In operation, the connecting tab 412 is configured to be urged into the passage 403 of the outboard fitting 324, and deflect into the connection pocket 405 to securely latch the outboard coupler 336 to the outboard fitting 324 (for example, an end of the connecting tab 412 secures over an upper surface of the covering panel 336). In order to remove the outboard coupler 336 from the outboard fitting 324, the outboard end 342 is pivoted downwardly away from the outboard rail 326, at which point the connecting tab 412 upwardly deflects from a latching position over the upper surface of the covering panel 336 and is able to be removed from the passage 403.

Referring to FIGS. 7 and 8, the section divider assembly 320 removably secures to structural features within the cabin at two different points. In particular, the inboard coupler 334 secures the section divider assembly 320 to the inboard fitting 322 that is secured to the strongback 308, while the outboard coupler 336 secures the section divider assembly 320 to the outboard fitting 324 that is secured to the outboard rail 326. In this manner, a section divider positioning system within a cabin of an aircraft includes the section divider assembly 320 having the inboard coupler 334 and the outboard coupler 336, the inboard fitting 322 secured to the strongback 308, and the outboard fitting 324 secured to the outboard rail 326. A cabin of a vehicle may include a plurality of inboard fittings 322 and associated outboard fittings 324 along a length of the cabin in order to allow the section divider assembly 320 to be selectively positioned and repositioned within the cabin.

In order to secure the section divider assembly 320 within the cabin, the latch 390 of the inboard coupler 334 is first inserted into the latch opening 372 of the inboard fitting 322 until the opposed clamps 366 securely clamp onto the latching prongs 394. The inboard fitting 322 is aligned with the outboard fitting 324 so that when the opposed clamps 366 are securely clamped onto the latching prongs 394, the outboard coupler 336 is in proper alignment with the outboard fitting 324. Thus, after the inboard coupler 334 is securely latched to the inboard fitting 322, the outboard end 342 of the section divider assembly 320 is upwardly pivoted (such that the section divider assembly 320 upwardly pivots about the connection between the inboard coupler 334 and the inboard fitting 322 until the connecting tab 412 moves into the passage 403 of the outboard fitting 324 and deflects into a securely latched position). In this manner, the section divider assembly 320 is secured at an inboard location and an outboard location, thereby providing a secure and stable connection.

In order to remove the section divider assembly 320, the outboard coupler 336 may be downwardly moved so that the outboard coupler 336 separates from the outboard fitting 324, as described above. In this position, the inboard coupler 334 is still latched to the inboard fitting 322, thereby preventing the section divider assembly 320 from falling down. An individual may then squeeze the levers 368 together so that the clamps 366 release from the prongs 394, and the individual may then pull the inboard coupler 334 out of the inboard fitting 322, so that the section divider assembly 320 may be moved to a different location.

In the event that an individual first disengages the inboard coupler 334 from the inboard fitting 322 (such as via pressing the levers 368 together), the outboard coupler 336 remains secured to the outboard fitting 324. As such, the connection between the outboard coupler 336 and the outboard fitting 324 may prevent the latch 390 from fully ejecting from the first fitting 322, thereby preventing or otherwise reducing the risk that the section divider assembly 320 falls down.

Figure 9:
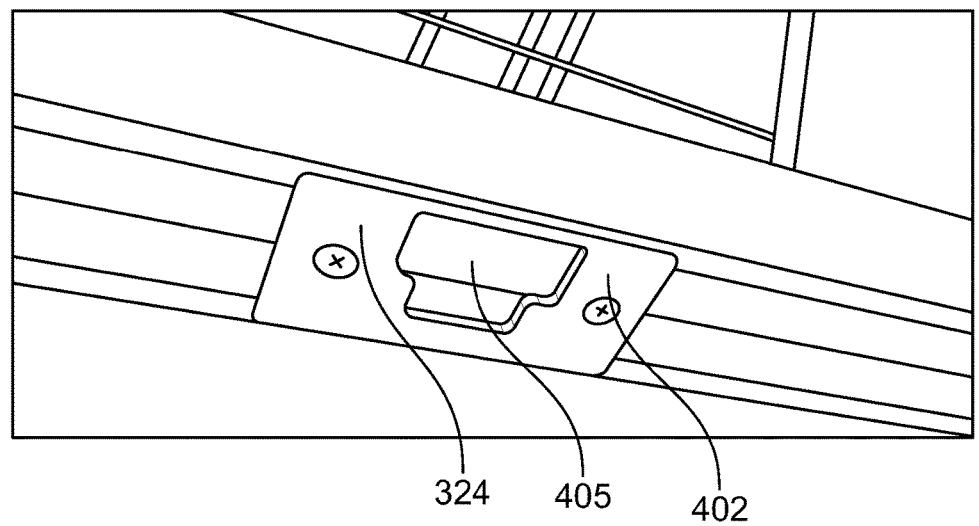
FIG. 9 illustrates a perspective bottom view of an outboard fitting secured to an outboard rail, according to an embodiment of the present disclosure.

FIG. 9 illustrates a perspective bottom view of the outboard fitting 324 secured to the outboard rail 326, according to an embodiment of the present disclosure. As shown, the outboard fitting 324 may be secured underneath the outboard rail 324 via fasteners. Because the outboard fitting 324 is mounted to the outboard rail 326 proximate an outboard wall and/or ceiling of the cabin 300 (shown in FIG. 5), the outboard fitting 324 is discrete and not easily seen within the cabin 300. Accordingly, the outboard fitting 324 may be hidden from view when the section divider assembly 320 is disconnected from (and connected to) the outboard fitting 324. The section divider assembly 320 secures to the discrete outboard fitting 324 without the need for an adapter assembly, plate, and/or the like that is outside of an outer mold line of a stowage bin or passenger service unit.

Figure 10:
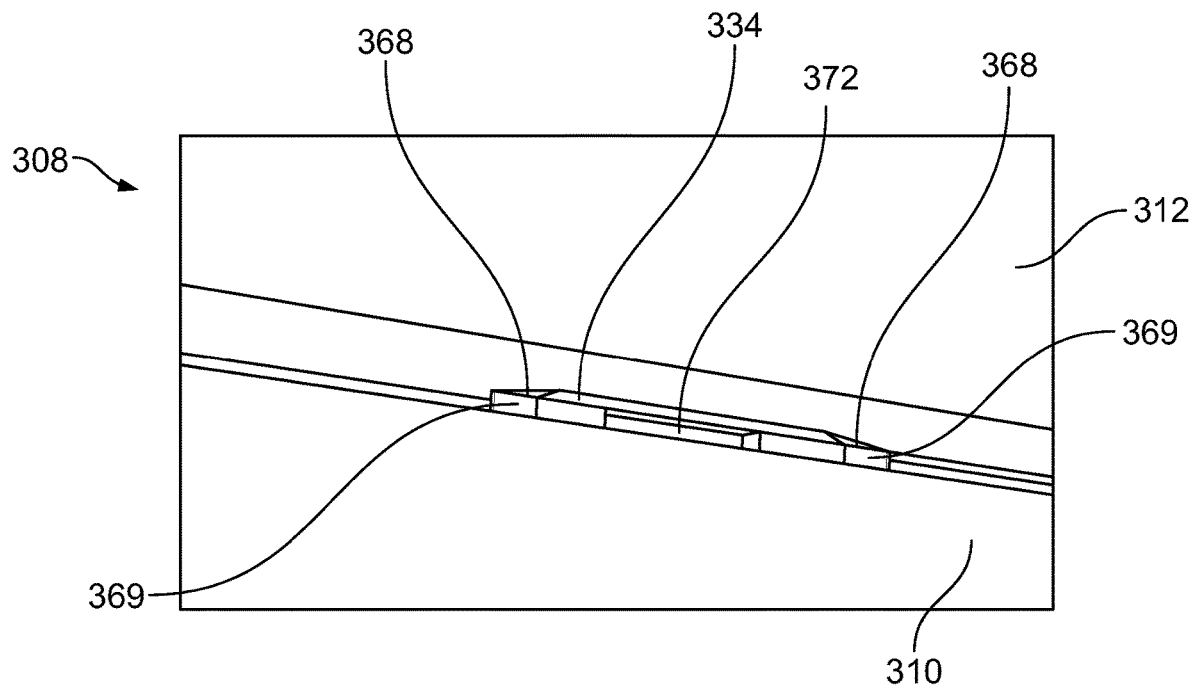
FIG. 10 illustrates a perspective front view of an inboard fitting secured to a strongback of a stowage bin assembly, according to an embodiment of the present disclosure.

FIG. 10 illustrates a perspective front view of the inboard fitting 334 secured to the strongback 310 of the stowage bin assembly 308, according to an embodiment of the present disclosure. As shown, the inboard fitting 334 is positioned between the strongback 310 and the pivot bin 312 when the pivot bin 312 is closed. As such, the inboard fitting 334 is discrete and not easily seen within the cabin. As such, the inboard fitting 334 may be hidden from view when the section divider assembly 320 is disconnected from (and connected to) the inboard fitting 334. The section divider assembly 320 secures to the discrete inboard fitting 334 without the need for an adapter assembly, plate, and/or the like that is outside of an outer mold line of a stowage bin or passenger service unit.

The levers 368 include proximate ends 369 that are configured to be squeezed together, as described above, such as when the pivot bin 312 is in an open position. Optionally, the levers 368 may not be used, but a separate and distinct tool (such as a pin, Allen wrench, or the like) may be inserted into the inboard fitting 334 to disengage the clamps 366 from the latch 390, as described above with respect to FIG. 7.

Figure 11:
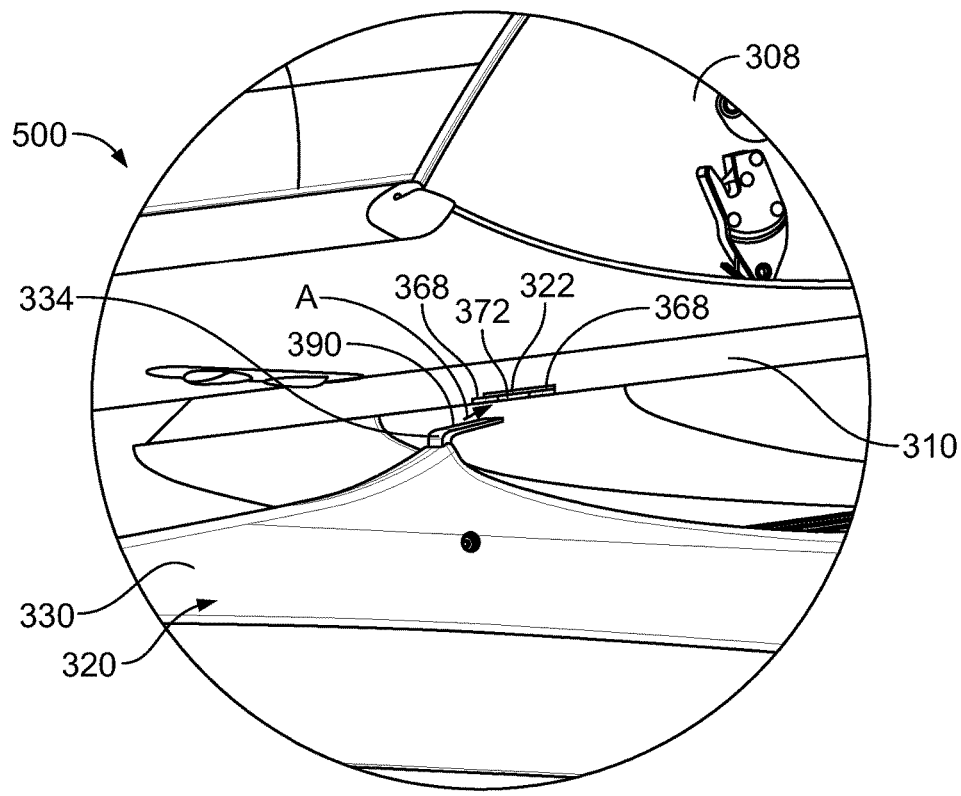
FIG. 11 illustrates a perspective view of an inboard coupler of a section divider assembly disconnected from an inboard fitting secured to a strongback of a stowage bin assembly, according to an embodiment of the present disclosure.
Figure 12:
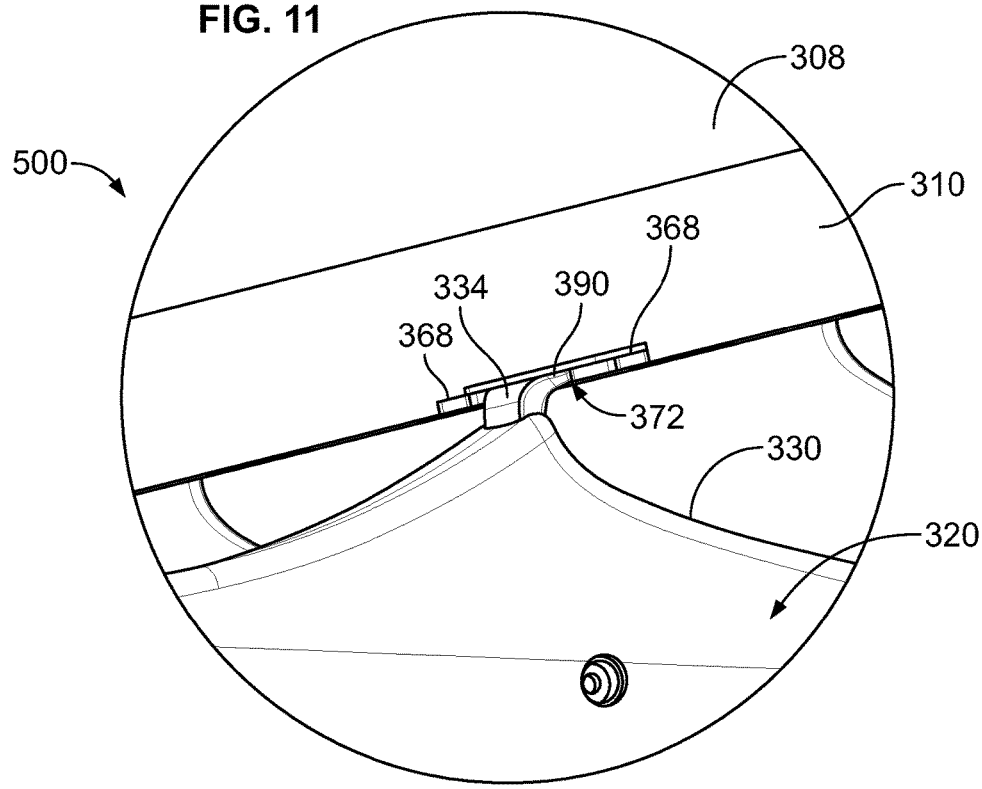
FIG. 12 illustrates a perspective view of an inboard coupler of a section divider assembly connected to an inboard fitting secured to a strongback of a stowage bin assembly, according to an embodiment of the present disclosure.

FIG. 11 illustrates a perspective view of the inboard coupler 334 of the section divider assembly 320 disconnected from the inboard fitting 322 secured to the strongback 310 of the stowage bin assembly 308, according to an embodiment of the present disclosure. FIG. 12 illustrates a perspective view of the inboard coupler 334 connected to the inboard fitting 322. Referring to FIGS. 11 and 12, in order to secure the inboard coupler 334 to the inboard fitting 322, the latch 390 is axially aligned with and urged into the latch opening 372 in the direction of arrow A (shown in FIG. 11).

Figure 13:
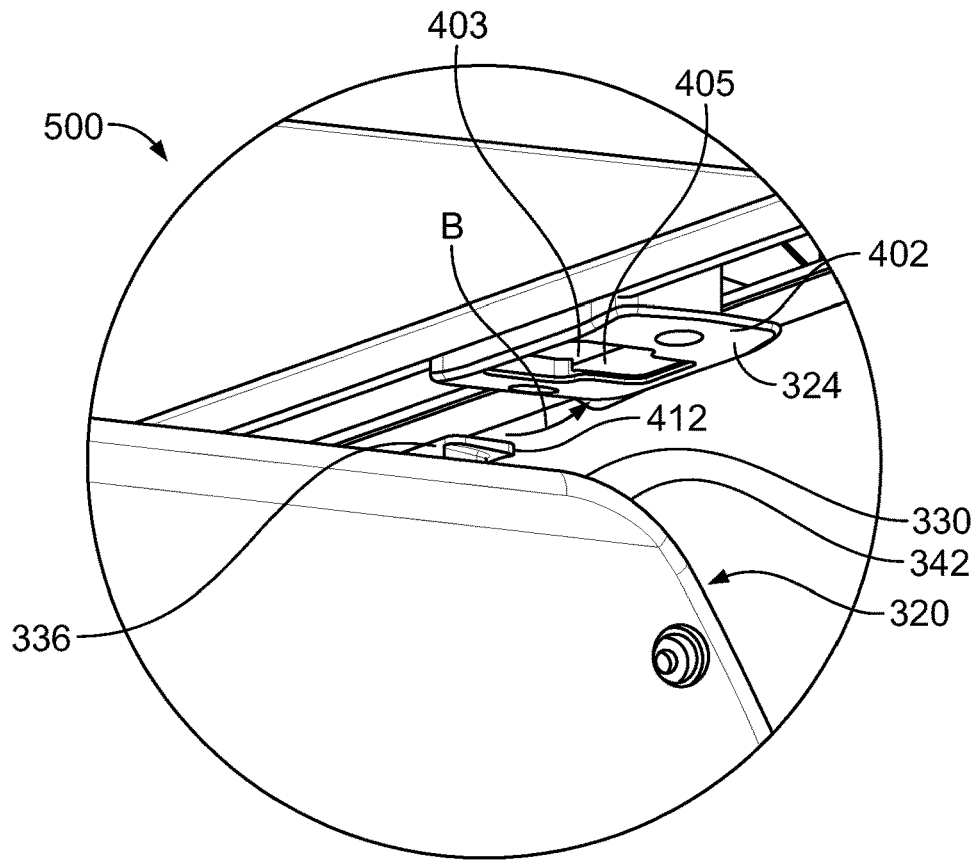
FIG. 13 illustrates a perspective view of an outboard coupler of a section divider assembly disconnected from an outboard fitting secured to an outboard rail, according to an embodiment of the present disclosure.
Figure 14:
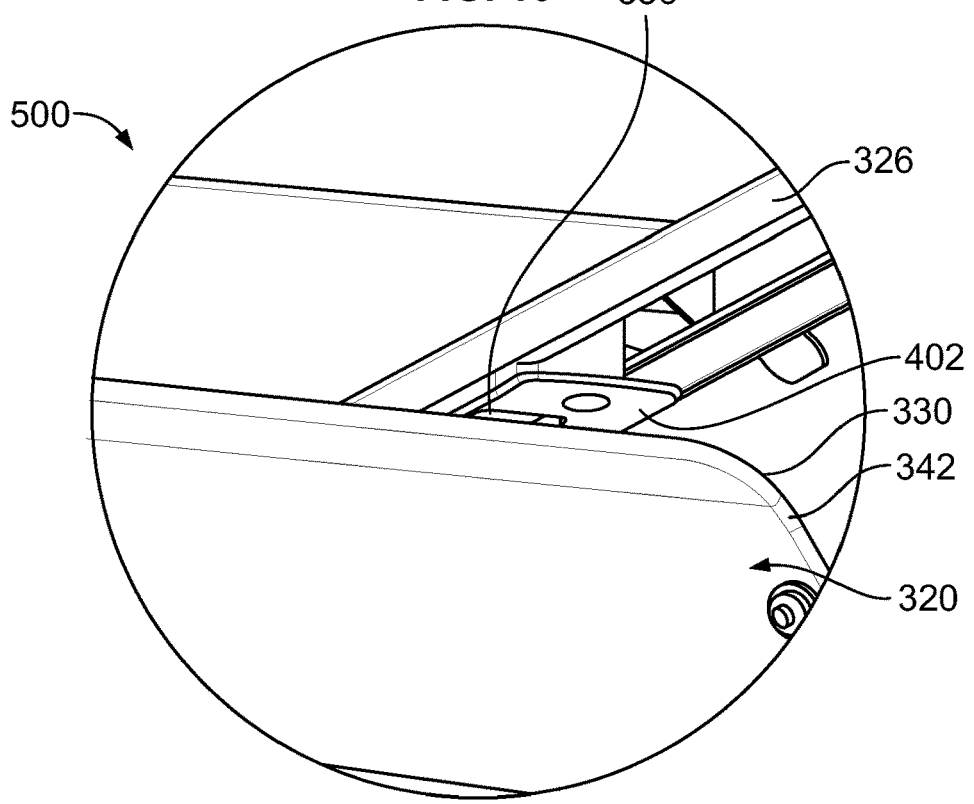
FIG. 14 illustrates a perspective view of an outboard coupler of a section divider assembly connected to an outboard fitting secured to an outboard rail, according to an embodiment of the present disclosure.

FIG. 13 illustrates a perspective view of the outboard coupler 336 of the section divider assembly 320 disconnected from the outboard fitting 324 secured to the outboard rail 326, according to an embodiment of the present disclosure. FIG. 14 illustrates a perspective view of the outboard coupler 336 connected to the outboard fitting 324. Referring to FIGS. 13 and 14, in order to secure the outboard coupler 336 to the outboard fitting 324, the outboard coupler 336 is pivoted upwardly into the passage 403 in the direction of arc B, so that the connection tab 412 enters into the connection pocket 405, and latches onto a structural portion of the outboard fitting 324, such as an upper surface of the covering panel 402.

Referring to FIGS. 11-14, the section divider positioning system 500 includes the section divider assembly 320 that removably secures to the inboard fitting 322 secured to the strongback 310, and the outboard fitting 324 secured to the outboard rail 326. The inboard coupler 334 of the section divider assembly 320 removably secures to the inboard fitting 322, while the outboard coupler 336 removably secures to the outboard fitting 322.

The section divider assembly 320 is configured to removably secured to separate and distinct inboard fittings 322 and associated outboard fittings 324 that are positioned in relation to seats within a cabin of a vehicle. For example, multiple seats of inboard fittings 322 and associated outboard fittings 324 are located within the cabin. The inboard fittings 322 are separated from one another, and the outboard fittings 324 are separated from one another. Instead of coupling to tracks, the section divider assembly 320 removably secures to an inboard fitting 322 and an associated outboard fitting 324 via an inboard coupler 334 and an outboard coupler 336. The section divider assembly 320 may be quickly and easily decoupled from the inboard fitting 322 and the outboard fitting 324, moved to a different location, and secured to another associated set of an inboard fitting 322 and an outboard fitting 324.

Figure 15:
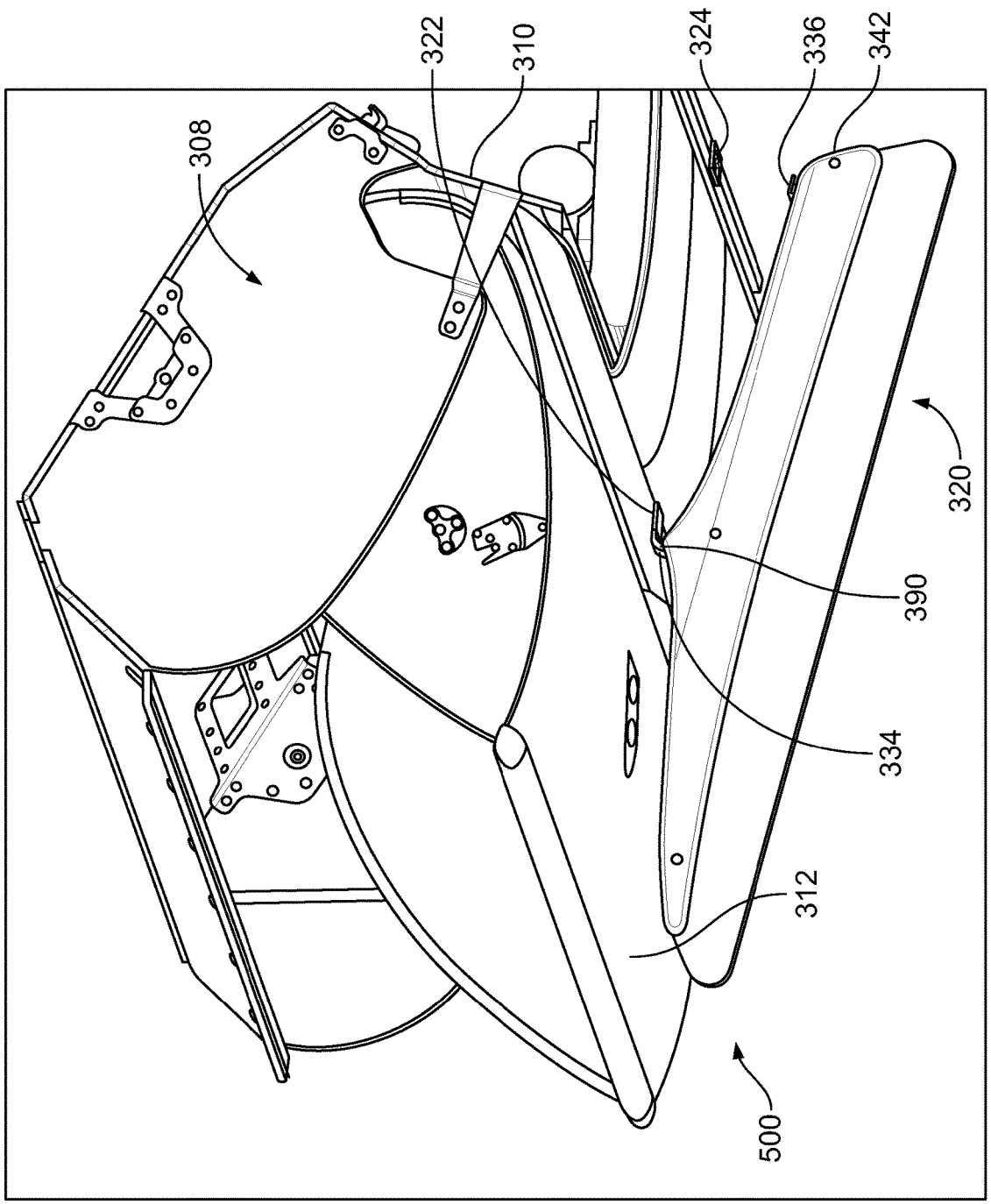
FIG. 15 illustrates a perspective view of a section divider assembly suspended from an inboard fitting, according to an embodiment of the present disclosure.

FIG. 15 illustrates a perspective view of the section divider assembly 320 suspended from the inboard fitting 322, according to an embodiment of the present disclosure. When the outboard coupler 336 is removed from the outboard fitting 324, the latch 390 remains secured to the inboard fitting 322. The outboard end 342 of the section divider assembly 320 may pivot down from the outboard fitting 324, but the latch 390 coupled to the inboard fitting 322 ensures that the section divider assembly 320 does not fall down (thereby providing a safety measure that reduces a likelihood of injury, and damage to the structures within the cabin and the section divider assembly 320). Referring to FIGS. 7, 10, and 15, the levers 368 may be inwardly squeezed to disengage the clamps 366 from the prongs 394. The section divider assembly 320 may then be pulled away from the inboard fitting 322.

Further, as the latch 390 is pulled out of the inboard fitting 322, the prongs 394 may be caught by expanded proximate ends 369 of the levers 368 and/or halted by stops formed in the inboard fitting 322. In this manner, the outboard fitting 322 provides an additional safety feature that maintains the section divider assembly 320 in a suspended position, such as until the levers 368 are again squeezed inwardly to allow the latch 390 to be removed from the inboard fitting 322 and/or the latch 390 is manipulated out of the inboard fitting 322.

Figure 16:
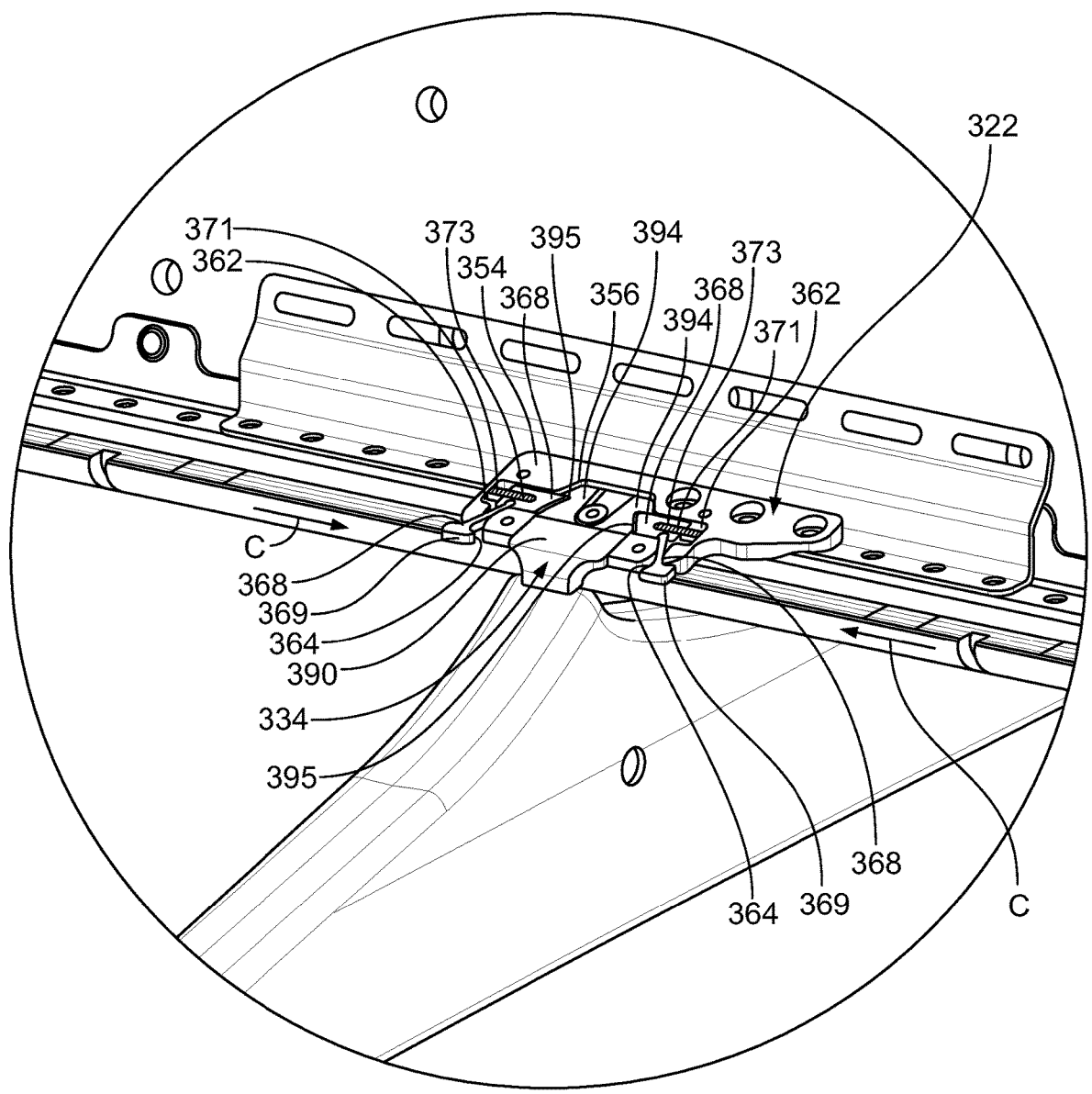
FIG. 16 illustrates a perspective top view of an inboard coupler securely retained within an inboard fitting, according to an embodiment of the present disclosure.

FIG. 16 illustrates a perspective top view of the inboard coupler 334 securely retained within the inboard fitting 322, according to an embodiment of the present disclosure. As shown, the prongs 394 of the latch 390 are fully inserted into the internal chamber 356 of the base 354, such that the clamps 368 are wedged in front of distal ledges 395 of the prongs 394, thereby securing the inboard coupler 334 to the inboard fitting 322. The clamps 368 may also include springs 373 that spring-bias the clamps into the prongs 394.

In order to disconnect the inboard coupler 334 from the inboard fitting 322, the expanded proximal ends 369 of the levers 368 are inwardly squeezed in the directions of arrows C. During this motion, canted arms 371 that are coupled to the clamps 368 overcome the forces exerted by the springs 373 and move the clamps 368 out of the wedged positions and away from the prongs 394, thereby allowing the latch 390 to be pulled out of the inboard fitting 322.

Figure 17:
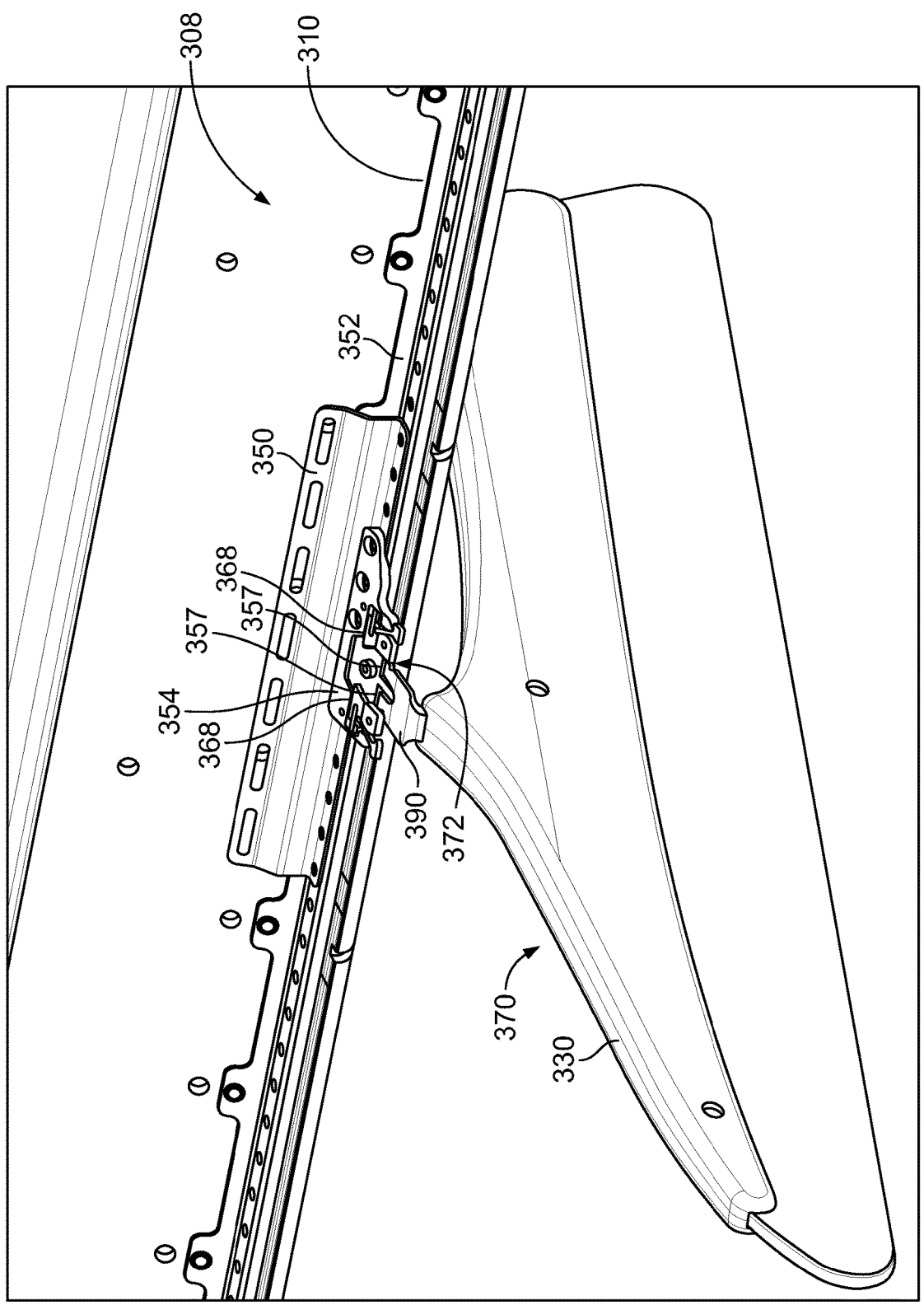
FIG. 17 illustrates a perspective top view of an inboard coupler in a suspended position in relation to an inboard fitting, according to an embodiment of the present disclosure.

FIG. 17 illustrates a perspective top view of the inboard coupler 334 in a suspended position in relation to the inboard fitting 322, according to an embodiment of the present disclosure. As base 354 may include one or more stops 357 proximate to the latch opening 372 that halt retreating motion of the latch 390 as the latch 390 retreats from the inboard fitting 322. The stops 357 may be upstanding protuberances (such as ribs, studs, bumps, or the like) that block motion, and/or recesses formed in the base 354 into which the prongs 394 drop. The stops 357 interact with the prongs 394 to provide a safety engagement that prevents the section divider assembly 320 from falling down. Instead, the stops 357 interact with the prongs 394 to hold the section divider assembly 320 in the suspended position. In order to remove the latch 390 from the stops 357, an individual may slightly raise the section divider assembly 320 to disengage the prongs 394 from the stops 357, at which point the latch 390 may then be removed from the inboard fitting 322. Alternatively, the inboard fitting 322 may not include the stops 357.

Figure 18:
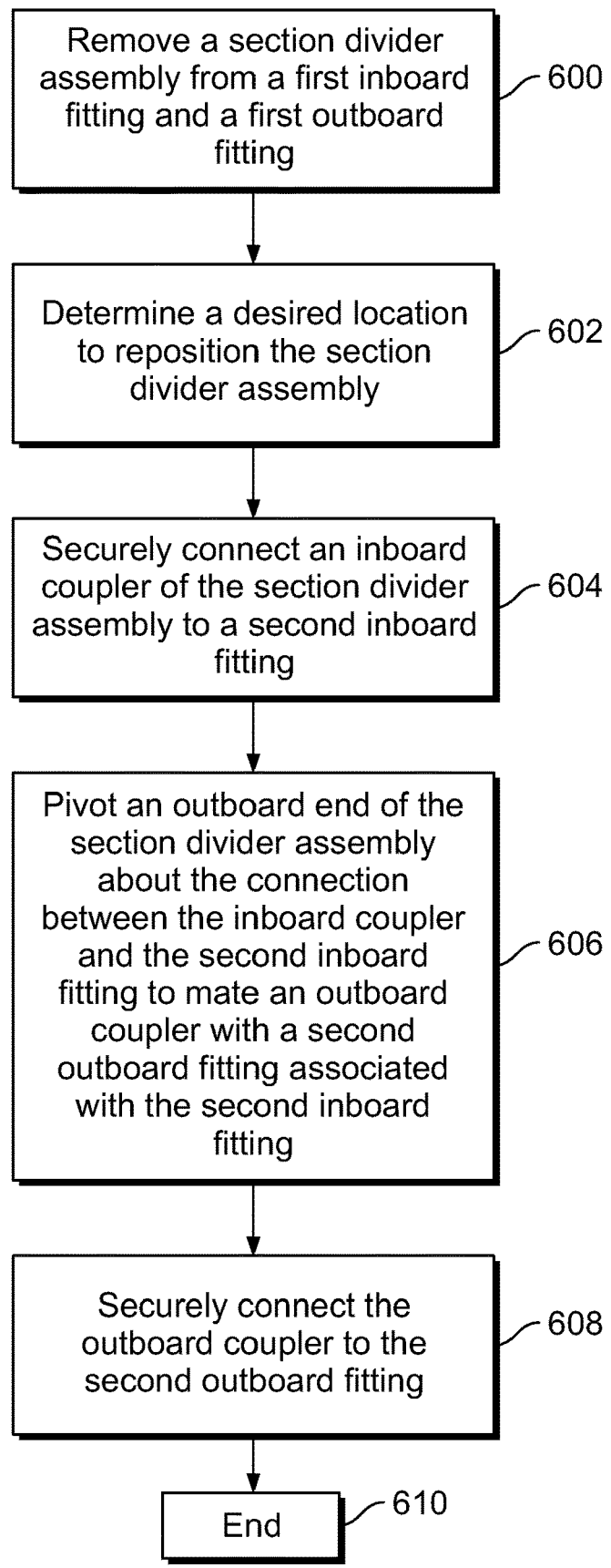
FIG. 18 illustrates a flow chart of a section divider positioning method within a cabin of a vehicle, according to an embodiment of the present disclosure.

FIG. 18 illustrates a flow chart of a section divider positioning method within a cabin of a vehicle, according to an embodiment of the present disclosure. The method begins at 600, at which a section divider assembly is removed from a first inboard fitting and a first outboard fitting. In particular, an outboard coupler of the section divider assembly may be removed from the outboard fitting, and then an inboard coupler of the section divider assembly is removed from the inboard fitting. At 602, an desired location within the cabin to reposition the section divider assembly is determined.

At 604, the inboard coupler of the section divider assembly is securely connected to a second inboard fitting that differs from, and is separated from, the first inboard fitting. At 606, an outboard end of the section divider assembly is then pivoted about the connection between the inboard coupler and the second inboard fitting to mate the outboard coupling with a second outboard fitting associated with the second inboard fitting. The second outboard fitting differs from, and is separated from, the first outboard fitting. At 608, the outboard coupler is then securely connected to the second outboard fitting. The method ends at 610.

As described above with respect to FIGS. 1-18, embodiments of the present disclosure provide systems and method that allow a section divider assembly to be quickly and efficiently repositioned within an interior cabin of a vehicle. Further, embodiments of the present disclosure provide systems and method that allow section divider assembly to be quickly and easily moved by flight attendants between flights (for example, scheduled legs) of an aircraft.

The terms inboard and outboard as used herein refer to the orientations shown in the Figures. It is to be understood that an inboard coupler or fitting may be an outboard coupler or fitting, and vice versa, depending on a position of a stowage bin assembly in relation to another portion of the aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A section divider assembly that is configured for positioning above one or more seats and indicating a boundary of a section onboard a cabin of a vehicle, the section divider assembly comprising:
   an attachment header;
   a barrier extending downwardly from the attachment header;
   a first coupler secured to the attachment header, wherein the first coupler is configured to removably secure to a first fitting secured to a strongback of a stowage bin assembly within the cabin, wherein the first fitting comprises: (a) a base defining an internal chamber, wherein the internal chamber includes opposed clamp pockets and opposed lever pockets, wherein a latch opening is defined at a front of the base, wherein the latch opening is configured to receive a latch of the first coupler; (b) opposed clamps retained with the opposed clamp pockets, wherein the opposed clamps securely engage a portion of the first coupler; and (c) opposed levers retained with the opposed lever pockets, wherein the lever pockets are operably connected to the opposed clamps to selectively move the opposed clamps in relation to the latch; and
   a second coupler secured to the attachment header and spaced apart from the first coupler, wherein the second coupler is configured to removably secure to a second fitting secured to a fixed rail within the cabin.

2. The section divider assembly of claim 1, wherein the first coupler is an inboard coupling, the first fitting is an inboard fitting, the second coupler is an outboard coupling, and the second fitting is an outboard fitting secured to the fixed rail.

3. The section divider assembly of claim 1, wherein the first fitting and the second fitting are hidden from view when the section divider assembly is disconnected therefrom.

4. The section divider assembly of claim 1, wherein the first fitting further comprises a cantilevered beam that is configured to cantilever the first fitting in relation to the strongback.

5. The section divider assembly of claim 1, wherein the first coupler comprises a latch.

6. The section divider assembly of claim 1, wherein the second fitting comprises:
   an adapter that secures to the fixed rail; and
   a covering panel connected to the adapter, wherein the covering panel includes a passage formed therethrough, wherein a connection pocket connects to the passage and is defined between the adapter and the covering panel.

7. The section divider assembly of claim 1, wherein the second coupler comprises a resilient connecting tab that is configured to removably secure to the second fitting.

8. The section divider assembly of claim 1, wherein the first coupler is latchable to the first fitting, and wherein the second coupler is upwardly pivotable about a connection between the first coupler and the first fitting into a secure connection with the second fitting.

9. The section divider assembly of claim 1, wherein the first fitting is positioned between the strongback and a pivot bin when the pivot bin is closed, and wherein the second fitting is secured underneath the fixed rail.

10. The section divider assembly of claim 1, wherein the first coupler is configured to suspend the section divider assembly from the first fitting when the second coupler is disconnected from the second fitting.

11. The section divider assembly of claim 10, wherein the first fitting comprises one or more stops proximate to a latch opening, wherein the one or more stops are configured to halt retreating motion of the first coupler in relation to the first fitting.

12. The section divider assembly of claim 1, wherein the first coupler is configured to removably secure, in a toolless manner, to the first fitting, and wherein the second coupler is configured to removably secure, in a toolless manner, to the second fitting.

13. A section divider positioning system within a cabin of a vehicle, the section divider positioning system comprising:
   a stowage bin assembly within the cabin, wherein the stowage bin assembly includes a fixed strongback and a pivot bin connected to the strongback, wherein the pivot bin is configured to move between open and closed positions in relation to the strongback;
   a first fitting secured to the strongback, wherein the first fitting comprises: (a) a base defining an internal chamber, wherein the internal chamber includes opposed clamp pockets and opposed lever pockets, wherein a latch opening is defined at a front of the base; (b) opposed clamps retained with the opposed clamp pockets; and (c) opposed levers retained with the opposed lever pockets, wherein the lever pockets are operably connected to the opposed clamps to selectively move the opposed clamps in relation to the latch;

a fixed rail that extends over a length of at least a portion of the cabin, wherein the fixed rail is spaced apart from the strongback;

a second fitting secured the fixed rail; and a section divider assembly that is configured for positioning above one or more seats and indicating a boundary of a section onboard the cabin, the section divider assembly comprising:

an attachment header;

a barrier extending downwardly from the attachment header;

a first coupler secured to the attachment header, wherein the first coupler comprises a latch, and is configured to removably secure to the first fitting secured to the strongback, wherein the latch opening is configured to receive the latch of the first coupler, wherein the opposed clamps securely engage a portion of the first coupler; and a second coupler secured to the attachment header and spaced apart from the first coupler, wherein the second coupler is configured to removably secure to the second fitting secured to the fixed rail.

14. The section divider positioning system of claim 13, wherein the first coupler is an inboard coupling, the first fitting is an inboard fitting, the second coupler is an outboard coupling, and the second fitting is an outboard fitting secured to the fixed rail.

15. The section divider positioning system of claim 13, wherein the first fitting and the second fitting are hidden from view when the section divider assembly is disconnected from one or both of the first fitting or the second fitting.

16. The section divider positioning system of claim 13, wherein the second coupler comprises a resilient connecting tab that is configured to removably secure to the second fitting, wherein the second fitting comprises:

an adapter that secures to the fixed rail; and a covering panel connected to the adapter, wherein the covering panel includes a passage formed therethrough, wherein a connection pocket connects to the passage and is defined between the adapter and the covering panel.

17. The section divider positioning system of claim 13, wherein the first coupler latchable to the first fitting, and wherein the second coupler is upwardly pivotable about a connection between the first coupler and the first fitting into a secure connection with the second fitting.

18. The section divider positioning system of claim 13, wherein the first fitting is positioned between the strongback and the pivot bin when the pivot bin is closed, and wherein the second fitting is secured underneath the fixed rail.

19. The section divider positioning system of claim 13, wherein the first coupler is configured to suspend the section divider assembly from the first fitting when the second coupler is disconnected from the second fitting.

20. The section divider positioning system of claim 19, wherein the first fitting comprises one or more stops proximate to a latch opening, wherein the one or more stops are configured to halt retreating motion of the first coupler in relation to the first fitting.

21. The section divider positioning system of claim 13, wherein the first coupler is configured to removably secure, in a toolless manner, to the first fitting, and wherein the second coupler is configured to removably secure, in a toolless manner, to the second fitting.

22. A section divider positioning method within a cabin of a vehicle, the section divider positioning method comprising:

securing a first fitting to a strongback of a stowage bin assembly within the cabin, wherein the first fitting comprises:

a base defining an internal chamber including opposed clamp pockets and opposed lever pockets;

opposed clamps retained with the opposed clamp pockets; and opposed levers retained with the opposed lever pockets, wherein the lever pockets are operably connected to the opposed clamps to selectively move the opposed clamps in relation to the latch;

securing a second fitting to a fixed rail that extends over a length of at least a portion of the cabin, wherein the fixed rail is spaced apart from the strongback, wherein the second fitting comprises:

an adapter that secures to the fixed rail; and a covering panel connected to the adapter, wherein the covering panel includes a passage formed therethrough, wherein a connection pocket connects to the passage and is defined between the adapter and the covering panel; and removably positioning the section divider assembly above one or more seats within the cabin to indicate a boundary of a section onboard the cabin, wherein the removably positioning comprises:

removably securing a first coupler of the section divider assembly to the first fitting; and removably securing a second coupler of the section divider assembly to the second fitting.

23. The section divider positioning method of claim 22, wherein the first fitting comprises: (a) a base defining an internal chamber, wherein the internal chamber includes opposed clamp pockets and opposed lever pockets, wherein a latch opening is defined at a front of the base, wherein the latch opening is configured to receive a latch of a first coupler of a section divider assembly; (b) opposed clamps retained with the opposed clamp pockets, wherein the opposed clamps securely engage a portion of the first coupler; and (c) opposed levers retained with the opposed lever pockets, wherein the lever pockets are operably connected to the opposed clamps to selectively move the opposed clamps in relation to the latch.

24. The section divider positioning method of claim 22, wherein the second fitting comprises: (a) an adapter that secures to the fixed rail; and (b) a covering panel connected to the adapter, wherein the covering panel includes a passage formed therethrough, wherein a connection pocket connects to the passage and is defined between the adapter and the covering panel.

25. A section divider assembly that is configured for positioning above one or more seats and indicating a boundary of a section onboard a cabin of a vehicle, the section divider assembly comprising:

an attachment header;

a barrier extending downwardly from the attachment header;

a first coupler secured to the attachment header, wherein the first coupler is configured to removably secure to a first fitting secured to a strongback of a stowage bin assembly within the cabin; and a second coupler secured to the attachment header and spaced apart from the first coupler, wherein the second coupler is configured to removably secure to a second fitting secured to a fixed rail within the cabin, wherein the second fitting comprises: (a) an adapter that secures to the fixed rail; and (b) a covering panel connected to the adapter, wherein the covering panel includes a passage formed therethrough, wherein a connection pocket connects to the passage and is defined between the adapter and the covering panel.

26. A section divider positioning system within a cabin of a vehicle, the section divider positioning system comprising:
a stowage bin assembly within the cabin, wherein the stowage bin assembly includes a fixed strongback and a pivot bin connected to the strongback, wherein the pivot bin is configured to move between open and closed positions in relation to the strongback;
a first fitting secured to the strongback;
a fixed rail that extends over a length of at least a portion of the cabin, wherein the fixed rail is spaced apart from the strongback;
a second fitting secured the fixed rail, wherein the second fitting comprises: (a) an adapter that secures to the fixed rail; and (b) a covering panel connected to the adapter, wherein the covering panel includes a passage formed therethrough, wherein a connection pocket connects to the passage and is defined between the adapter and the covering panel; and
a section divider assembly that is configured for positioning above one or more seats and indicating a boundary of a section onboard the cabin, the section divider assembly comprising:
an attachment header;
a barrier extending downwardly from the attachment header;
a first coupler secured to the attachment header, wherein the first coupler is configured to removably secure to the first fitting secured to the strongback; and
a second coupler secured to the attachment header and spaced apart from the first coupler, wherein the second coupler is configured to removably secure to the second fitting secured to the fixed rail, wherein the second coupler comprises a resilient connecting tab that is configured to removably secure to the second fitting.

* * * * *